Nov. 28, 1950     A. L. GINGRICH     2,531,677
INTERNAL RADIALLY ACTING HYDRAULIC WHEEL BRAKE
Filed Aug. 13, 1948
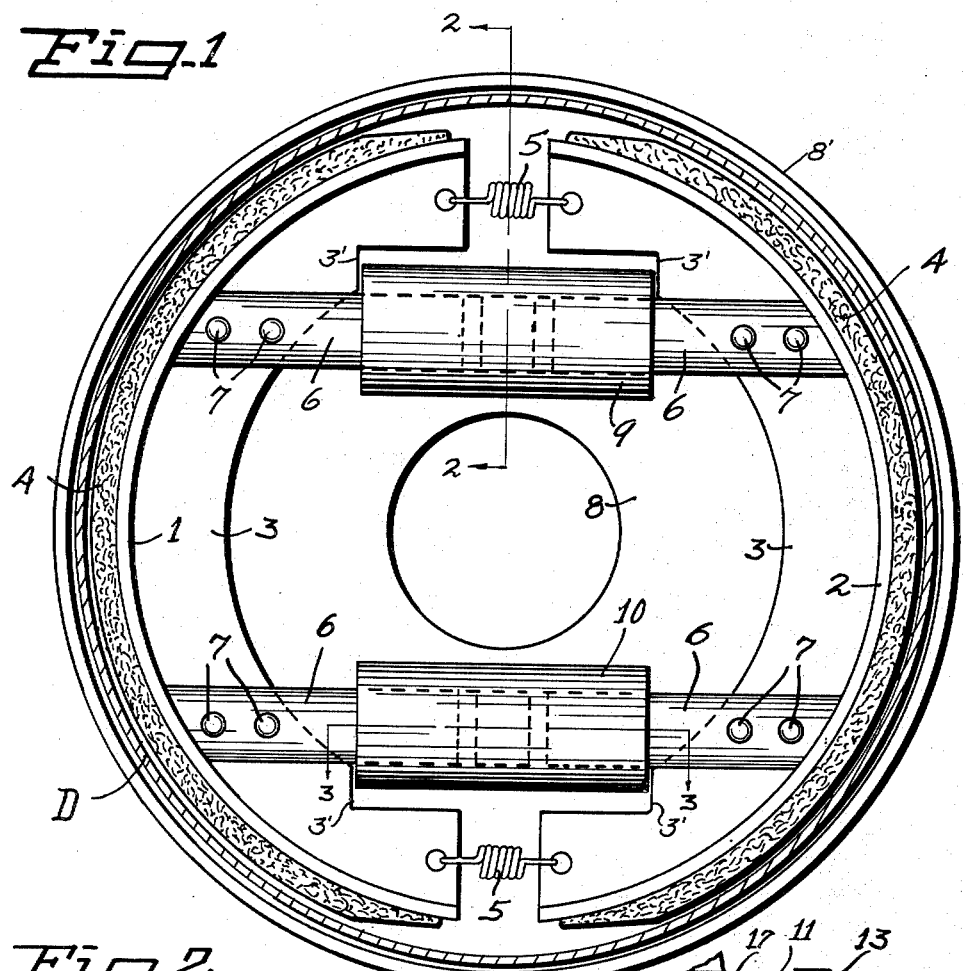
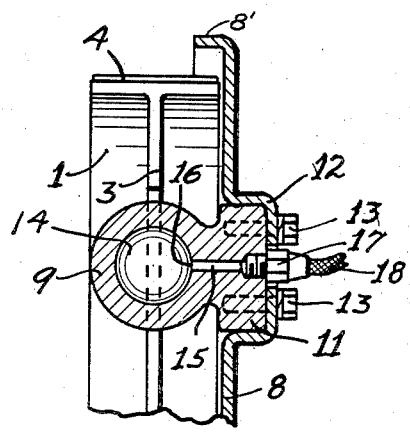
Allen L. Gingrich
INVENTOR.
BY Glenn L. Fish
ATTORNEY Patented Nov. 28, 1950

2,531,677

UNITED STATES PATENT OFFICE 2,531,677

INTERNAL RADIALLY ACTING HYDRAULIC WHEEL BRAKE

Allen L. Gingrich, Spokane, Wash.

Application August 13, 1948, Serial No. 44,119

1 Claim. (Cl. 188—152)

The present invention relates to improvements in hydraulic wheel brakes for automotive vehicles, of the transversely movable and expanding opposing rim-grip type, and adapted for taking up or automatically compensating for wear on the brake shoes.

The primary object of the invention is the provision of braking mechanism in which the brake shoes are equipped with a maximum available friction surface, and means are provided whereby the brake shoes are uniformly applied with equalized pressure over a maximum area of the brake drum, thereby increasing the efficiency of the braking mechanism. By the novel construction and use of the braking mechanism the usual brake linings are evenly worn, and the brake shoes with the linings are controlled to automatically take up wear and adjust the shoes as the width of the lining decreases due to wear.

In the physical embodiment of my invention a minimum number of parts are employed, which may with facility and low cost of production be manufactured, and the parts may be assembled with convenience to provide an assembly that may be installed with ease to assure a durable and reliable wheel brake that is simple in construction and operation.

The invention consists in certain novel features of construction and combinations and arrangements of parts as will hereinafter be described in detail and more particularly pointed out in the appended claims. In the accompanying drawings I have illustrated a complete example of a physical embodiment of my invention wherein the parts are combined and arranged in accord with one mode I have devised for the practical application of the principles of the invention. It will however be understood that changes and alterations are contemplated and may be made in these exemplifying drawings and mechanical structures, within the scope of my claim, without departing from the principles of the invention.

Figure 1 is a face view at the inner side of the braking mechanism showing the brake drum in section.

Figure 2 is a transverse vertical sectional view at line 2—2 of Fig. 1; and

Figure 3 is a horizontal sectional view at line 3—3 of Fig. 1.

In Fig. 1 the annular rim of a typical brake drum is shown in section at D, and two transversely arranged and movable shoes 1 and 2, each provided with an inner flange 3, and linings 4, are mounted for engagement with the rim; a pair of retracting springs 5, 5, being employed for drawing the shoes towards each other and resiliently holding the linings of the shoes out of engagement with the rim D of the drum.

In carrying out my invention each of the flanges of the shoes is equipped with a pair of piston rods as 6, 6, which may be bifurcated or slotted at their outer ends to fit on the flanges, and rivets 7, 7 are employed for rigidly mounting the rods on the flanges.

The four inwardly projecting rods are arranged in vertically spaced and axially alined pairs extending horizontally and transversely, one pair above the center of the drum and the other pair below the center of the drum, and the adjoining ends of the pairs terminate a predetermined distance apart to provide vertically alined gaps.

The drum is equipped with a rigidly supported circular backing plate or base 8 having about its periphery a lip 8 which overlaps the brake driven, and two hydraulic cylinders 9 and 10 of the expanding chamber type, having open ends, are mounted on the base plate by means of lugs or tongues 11 that are seated in recesses 12 of the base plate and rigidly fixed thereto by means of bolts 13.

The adjoining ends of two alined piston rods are slidably mounted in the opposite open ends of the cylinders, and the inner end of each rod is equipped with a packing gland or washer as 14 to provide a sealed expansion chamber in the center of each cylinder, between adjoining piston-ends.

For introducing hydraulic pressure into each cylinder to expand the brake-shoes, the cylinder wall and its tongue are provided with a bore 15 having an inner port 16 open to the interior of the cylinder, or its expansion chamber, and a threaded coupling 17 is attached to the bored tongue and equipped with a hose 18 that extends to a usual master cylinder of a hydraulic brake operating mechanism.

Under manual control, when hydraulic pressure from the master cylinder is introduced into the expansion chambers of the two cylinders, the pressure is equally applied to the inner adjoining ends or heads of the pistons or rods, and the latter are projected outwardly, thus uniformly pressing the shoe linings against the rim of the drum. Retracting movement of the shoes is finished by engagement of the shoulders 3' of their flanges 3 with ends of cylinders 9 and 10. Braking torque is taken care of due to the fact that the pistons 6 of each shoe are disposed in spaced parallel relation to each other and fit snugly in the cylinders.

By the use of the two cylinders and their pairs of piston rods a direct pressure is applied above and below the center of each brake shoe, thus uniformly distributing the application of power throughout the entire area of the brake linings to the brake drum, and enhancing the braking effect. As the brake linings wear and become thinner, the relatively movable pistons in their cylinders automatically compensate for the wear with a longer reciprocating movement, or strokes, and of course when necessary, the brake shoes may readily be re-lined and adjusted with a minimum expenditure of time and labor.

Having thus fully described my invention, what I claim as new and desire to secure by Letters Patent, is:

In a hydraulic brake structure, a circular backing plate having an annular lip about the periphery thereof, portions of the backing plate being outwardly offset and forming internal recesses, disposed parallel to each other and located at opposite sides of the center of the backing plate in radially spaced relation thereto, shoes on said backing plate extending circumferentially thereof, cylinders on said backing plate disposed parallel to each other and being each open at opposite ends, tongues extending along side portions of said cylinders and projecting laterally from the cylinders and fitting snugly in the recesses, fasteners passing through walls of the recesses and into the tongues and removably securing the tongues in the recesses, said tongues being formed midway their length with transversely extending bores having inner ends communicating with the cylinders and having their outer end portions threaded and forming sockets registering with openings formed in the walls of the recesses, hose couplings passing through the openings in the walls of the recesses and screwed into the sockets of the bores, and pistons secured to said shoes and slidably fitting into the cylinders through opposite ends thereof.

ALLEN L. GINGRICH.

REFERENCES CITED

The following references are of record in the file of this patent:

UNITED STATES PATENTS

| Number | Name | Date |
|---|---|---|
| 1,515,018 | Evans | Nov. 11, 1924 |
| 1,776,288 | Livingston | Sept. 23, 1930 |
| 2,141,358 | Meeks | Dec. 27, 1938 |
| 2,330,004 | Neville | Sept. 21, 1943 |
| 2,372,322 | Goepfrich | Mar. 27, 1945 |

FOREIGN PATENTS

| Number | Country | Date |
|---|---|---|
| 838,933 | France | Dec. 16, 1938 |